United States Patent
Ma

(10) Patent No.: US 7,123,492 B1
(45) Date of Patent: Oct. 17, 2006

(54) CIRCUIT FOR REDUCING INRUSH CURRENT GENERATED DURING STARTUP OF A SWITCHING POWER SUPPLY

(75) Inventor: Tu Hsien Ma, Yonghe (TW)

(73) Assignee: Princeton Technology Corporation, Taipei County (TW)

( * ) Notice: Subject to any disclaimer, the term of this patent is extended or adjusted under 35 U.S.C. 154(b) by 0 days.

(21) Appl. No.: 11/086,352

(22) Filed: Mar. 23, 2005

(51) Int. Cl.
*H02H 7/10* (2006.01)
*G05F 1/656* (2006.01)

(52) U.S. Cl. ............... 363/50; 323/222; 323/284

(58) Field of Classification Search ......... 323/901, 323/908, 222, 282, 284; 363/49, 50
See application file for complete search history.

(56) References Cited

U.S. PATENT DOCUMENTS

| 6,154,375 | A  | * | 11/2000 | Majid et al. ............... 363/16 |
| 6,356,063 | B1 | * | 3/2002  | Brooks ..................... 323/284 |
| 6,531,855 | B1 | * | 3/2003  | Miki et al. ................ 323/285 |
| 6,624,619 | B1 | * | 9/2003  | Fujita et al. .............. 323/288 |
| 6,922,042 | B1 | * | 7/2005  | Umemoto et al. .......... 323/283 |
| 7,002,330 | B1 | * | 2/2006  | Kitani et al. .............. 323/284 |

* cited by examiner

*Primary Examiner*—Bao Q. Vu
(74) *Attorney, Agent, or Firm*—Birch, Stewart, Kolasch & Birch, LLP

(57) ABSTRACT

A circuit for reducing inrush current generated during startup of a switching power supply, which includes a reference voltage generator, an error amplifier, an oscillator, a sawtooth wave generator, a PWM comparator, an overshoot comparator, an AND gate, a R-S flip-flop, a power MOS switch, and a rectifying and filtering circuit. A division voltage outputted from the rectifying and filtering circuit is fed to the error amplifier.

1 Claim, 5 Drawing Sheets

CIRCUIT FOR REDUCING INRUSH CURRENT GENERATED DURING STARTUP OF A SWITCHING POWER SUPPLY

FIELD OF THE INVENTION

The present invention relates to a modification to Pulse Width Modulation (PWM) switching power supply, and particularly to a circuit for reducing inrush current generated during startup of a switching power supply.

BACKGROUND OF THE INVENTION

Referring to FIG. 1, a circuit for PWM boost switching power supply is shown and comprises: a reference voltage generator 1, an error amplifier 2, an oscillator 3, a sawtooth wave generator 4, a PWM comparator 5, a R-S flip-flop 6, a power MOS switch 7, and a rectifying and filtering circuit consisted of inducer 8, diode 9, capacitor 10, and resistors 11, 12.

The output voltage $V_O$ at startup of the switching power supply is zero, and at this moment the whole loop is not stable. A reference voltage FB-vref generated by the reference voltage generator 1 is transmitted from point D to the terminal "+" of the error amplifier 2, while the terminal "−" of the error amplifier 2 is inputted with the feedback voltage from the division point C of the output voltage $V_O$. Due to the output voltage $V_O$ at startup of the switching power supply is zero, the output of the error amplifier 2 will be high. And then the output of the error amplifier 2 will be inputted to the terminal "−" of PWM comparator 5 so as to be compared with the output of the sawtooth wave generator 4, as shown in FIG. 2.

FIG. 2 shows the waveforms outputted from the oscillator 3, the sawtooth wave generator 4, the PWM comparator 5, and the R-S flip-flop 6 (the waveforms at the points A, E, G, B of FIG. 1), and the output waveform F of the error amplifier 2 is shown in comparison to the output waveform (of point E) outputted from the sawtooth generator 4. When the waveform (at point F) outputted from the error amplifier 2 is higher than the waveform (of point E) outputted from the sawtooth wave generator 4, the voltage outputted from the PWM comparator 5 (of point G) is zero. Once the waveform outputted from the error amplifier 2 is lower than that of the sawtooth generator 4, the PWM comparator 5 will output a square wave. The waveform outputted from the R-S flip-flop 6 (at point B) is opposite to the waveform at point G, and the square wave outputted from the PWM comparator 5 will trigger the terminal "R" of the R-S flip-flop 6 to enable the output voltage of the R-S flip-flop 6 to be zero. When the voltage outputted from the PWM comparator 5 is zero, the oscillator 3 will trigger the terminal "S" of the R-S flip-flop 6, so that the voltage outputted from the R-S flip-flop 6 will be high. The high voltage outputted by the R-S flip-flop 6 will turn on the power MOS switch 7 through point B (as shown in FIG. 1), so as to charge the capacitor 10, and consequently the output voltage $V_O$ will be increased. After the voltage from the division point C of the output voltage $V_O$ (as shown in FIG. 1) is fedback to the error amplifier 2, the output of the error amplifier 2 will be reduced. Despite the reduction of the output of the error amplifier 2, the oscillator 3 will output signals periodically, making the R-S flip-flop 6 generate output pulse, as the arrow indicated in FIG. 2. The output pulse enables the capacitor 6 to be recharged, leading to an overshoot of the output voltage $V_O$, as indicated by the "before-modification line" in FIG. 3. As a result, an inrush current will be caused and will damage the circuit.

The present invention has arisen to mitigate and/or obviate the afore-described disadvantages.

SUMMARY OF THE INVENTION

The primary objective of the present invention is to provide a circuit for reducing inrush current generated during startup of a switching power supply, comprising: a reference voltage generator, an error amplifier, an oscillator, a sawtooth wave generator, a PWM comparator, an overshoot comparator, an AND gate, a R-S flip-flop, a power MOS switch, and a rectifying and filtering circuit, wherein the reference voltage generator generates a high reference voltage and a low reference voltage, the high reference voltage is inputted to the overshoot comparator, the low reference voltage is inputted to the error amplifier, meanwhile, the division voltage outputted from the rectifying and filtering circuit is fed back to the error amplifier and the overshoot comparator, output of the overshoot comparator and that of the R-S flip-flop are inputted to the AND gate, and then an output of the AND gate is inputted to the power MOS switch.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Figure 1:
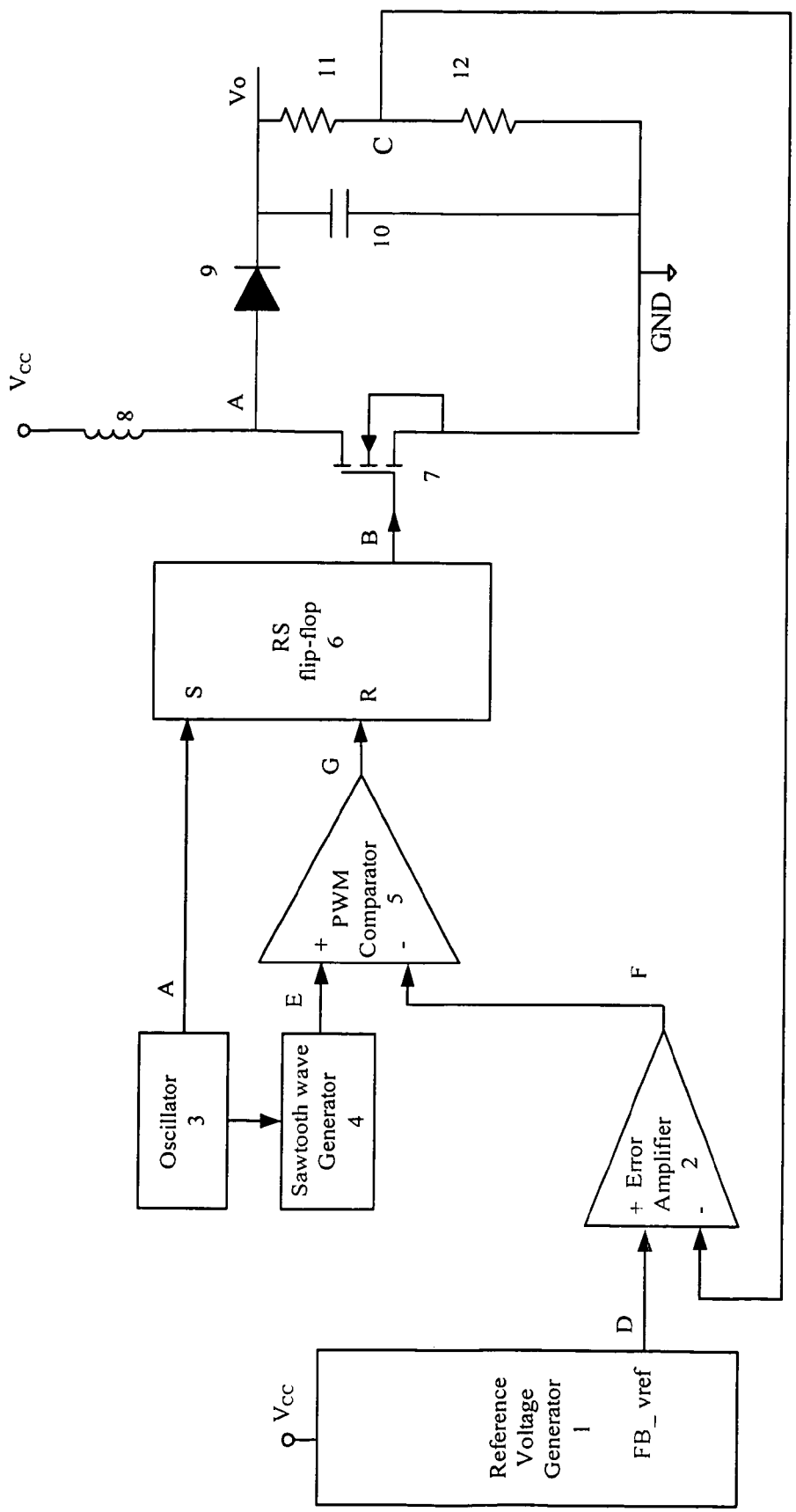
FIG. 1 is a circuit diagram of a conventional switching power supply.
Figure 2:
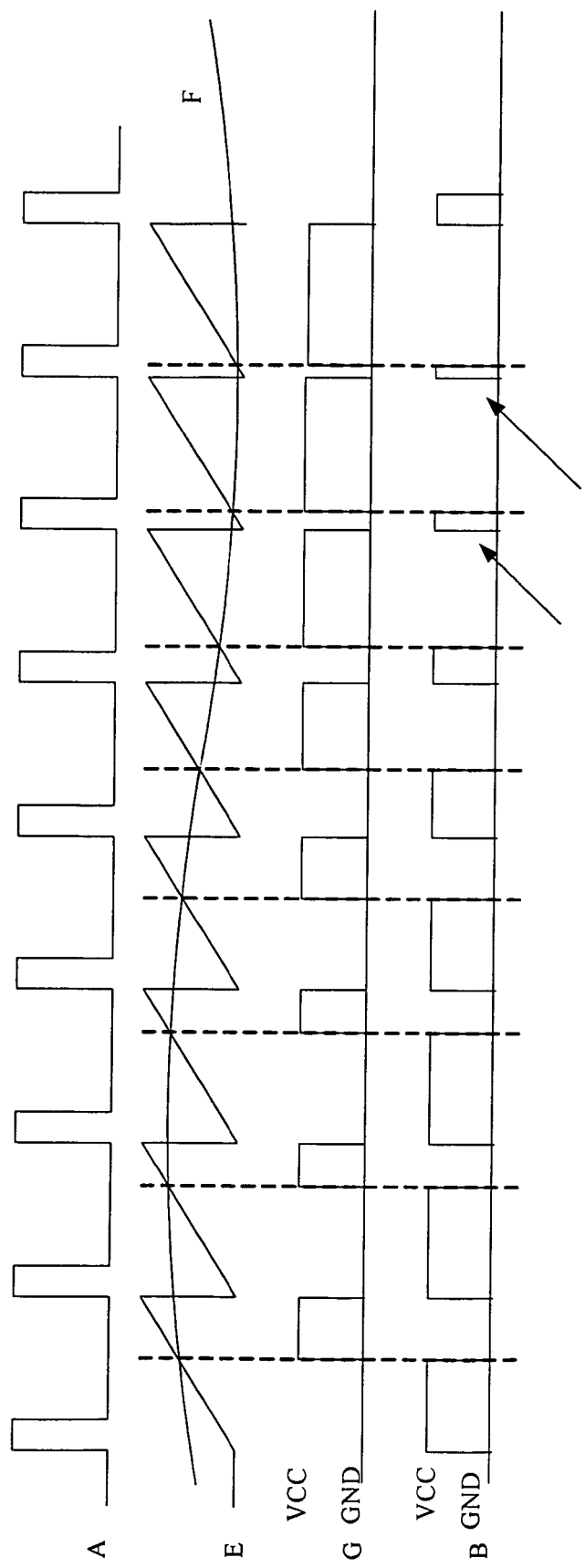
FIG. 2 shows the waveforms of the key circuit in the conventional switching power supply.
Figure 4:
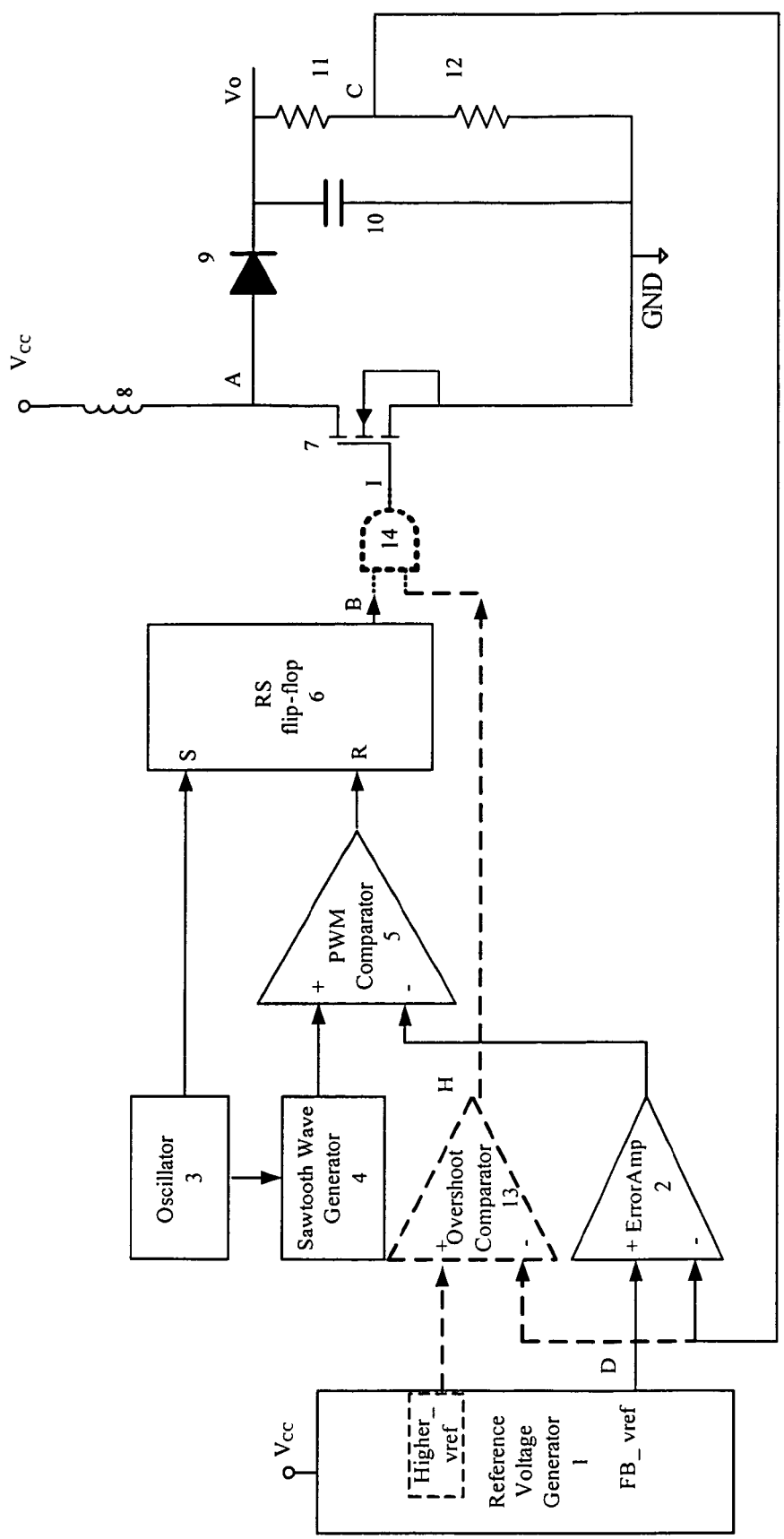
FIG. 4 shows a circuit for reducing inrush current generated during startup of a switching power supply in accordance with the present invention.

Referring to FIG. 4, a circuit for reducing inrush current generated during startup of a switching power supply in accordance with an embodiment of the present invention is modified from the circuit in FIG. 1, and the differences of the circuit in FIG. 4 from that in FIG. 1 are indicated by the dotted line. The reference voltage generator 1 in this embodiment additionally generates another reference voltage Higher-vref, and an overshoot comparator 13 is added to this circuit. The reference voltage Higher-vref is inputted to the terminal "+" of the overshoot comparator 13, and the feedback voltage of the point C is inputted to the terminal "−" of the overshoot comparator 13. Besides, an AND gate 14 is added to the point B of the R-S flip-flop 6, so that the output of the overshoot comparator 13 and that of the R-S flip-flop 6 are inputted to the AND gate 14, while the output of the AND gate 14 is inputted to the gate of the power MOS switch 7.

Figure 3:
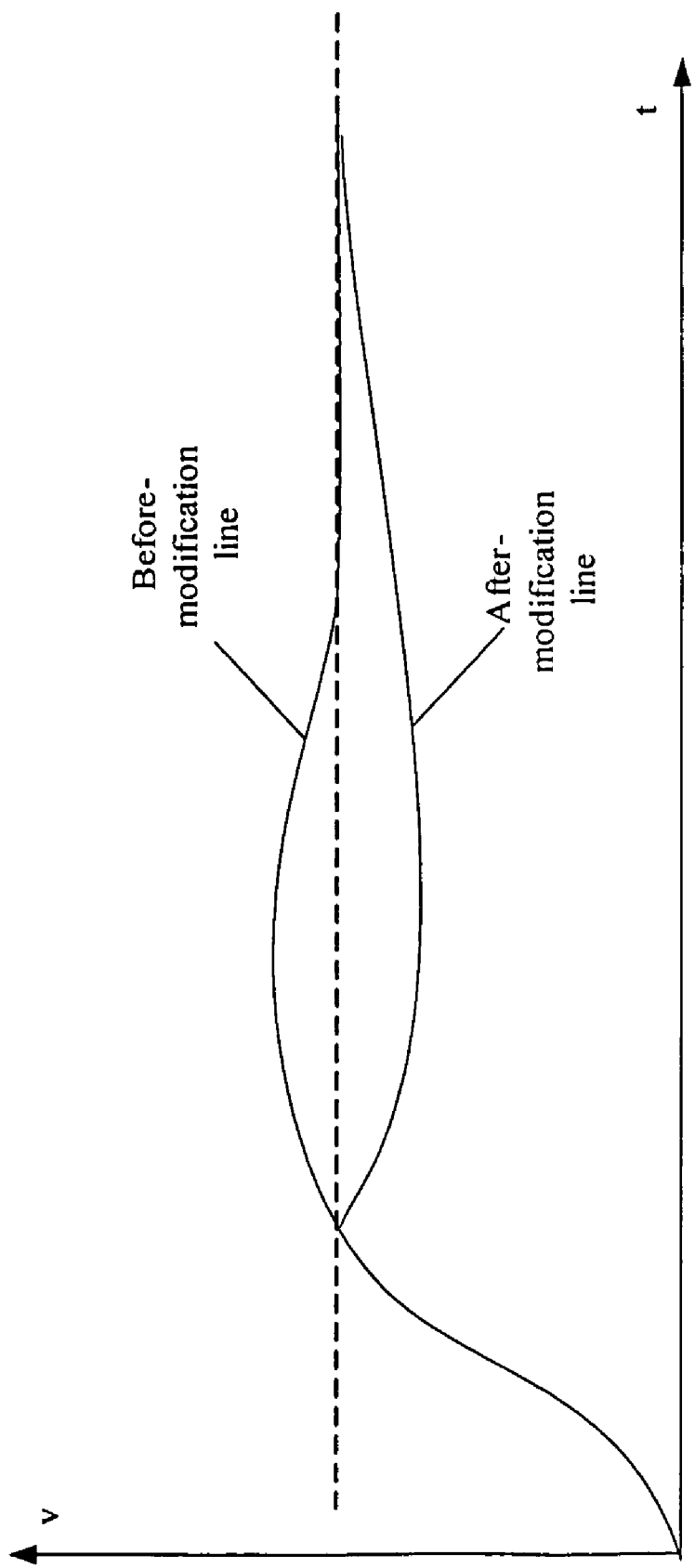
FIG. 3 shows the overshoot phenomenon caused at the startup of the conventional switching power supply.
Figure 5:
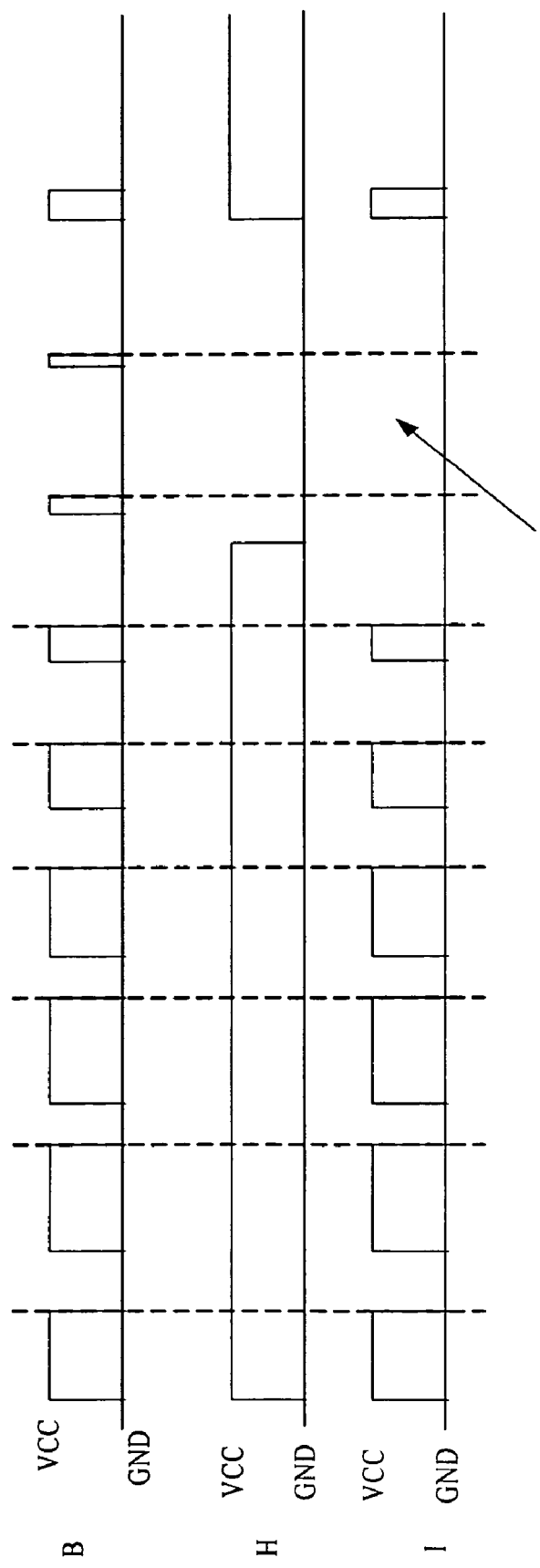
FIG. 5 shows the waveforms of the key circuit for reducing inrush current generated during startup of a switching power supply in accordance with the present invention.

The reference voltage Higher-vref is higher than the reference voltage FB-vref, during startup and before the whole loop is stabilized, the reference voltage Higher-vref is higher than the feedback voltage of the point C, and the output voltage (of point H) of the overshoot comparator 13 is a positive high voltage. Therefore, after the output of the overshoot comparator 13 and that of the R-S flip-flop 6 are inputted to the AND gate 14, the output voltage (at the point B) of the R-S flip-flop 6 can be unchangeably outputted from the AND gate 14 and inputted to the power MOS switch 7, as shown in FIG. 5. However, if the voltage $V_O$ increases gradually, and the feedback voltage at point C also increases to or beyond the reference voltage Higher-vref, the output voltage of the overshoot comparator 13 will be changed to zero. This zero output voltage and the output voltage of the R-S flip-flop 6 will be inputted to the AND gate 14, so that the output of the R-S flip-flop 6 will be screened, and consequently, the power MOS switched 7 cannot be switched on, as shown in FIG. 5 and indicated by the wave at the point I of the AND gate 14, in which the arrow shows the screening effect. Hence, when the output voltage $V_O$ increases to its maximum value, the AND gate 14 will stop outputting pulse, and the capacitor 10 is prevented from being recharged constantly, thus eliminating the overshoot of the output voltage $V_O$, as indicated by the "after-modification line" in FIG. 3.

While we have shown and described various embodiments in accordance with the present invention, it should be clear to those skilled in the art that further embodiments may be made without departing from the scope of the present invention.

What is claimed is:

1. A circuit for reducing inrush current generated during startup of a switching power supply, comprising:
   a reference voltage generator;
   an error amplifier;
   an oscillator;
   a sawtooth wave generator;
   a PWM comparator;
   an overshoot comparator;
   an AND gate;
   a R-S flip-flop;
   a power MOS switch; and
   a rectifying and filtering circuit,
   wherein a division voltage outputted from the rectifying and filtering circuit is fed back to the error amplifier, and the reference voltage generator generates a high reference voltage and a low reference voltage, the high reference voltage is inputted to the overshoot comparator, and the low reference voltage is inputted to the error amplifier, and
   wherein the division voltage outputted from the rectifying and filtering circuit is fed back to the error amplifier and the overshoot comparator, an output of the overshoot comparator and an output of the R-S flip-flop are inputted to the AND gate, and an output of the AND gate is inputted to the power MOS switch.

* * * * *